Oct. 5, 1965  S. YOUNG, JR  3,210,226
METHOD AND MEANS FOR CONTROLLING TAPERS IN ETCHING PROCESSES
Filed Sept. 28, 1961  2 Sheets-Sheet 1

$A/B = 1$ $A'/B' => 1$

INVENTOR.
SAMUEL YOUNG JR.
BY Thomas S. Macdonald
ATTORNEY

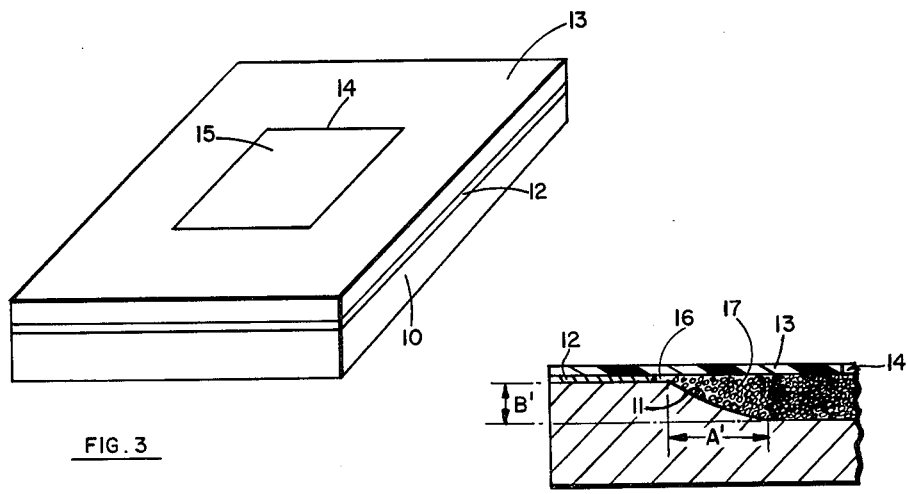
FIG. 3
FIG. 5
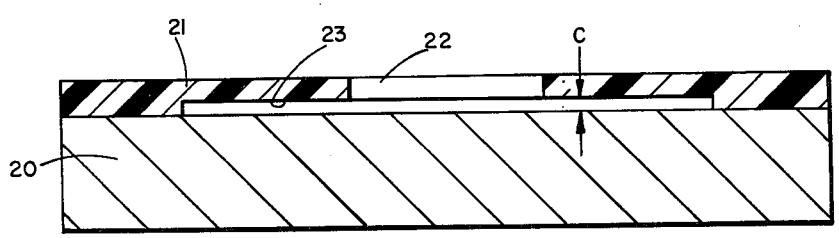
FIG. 6
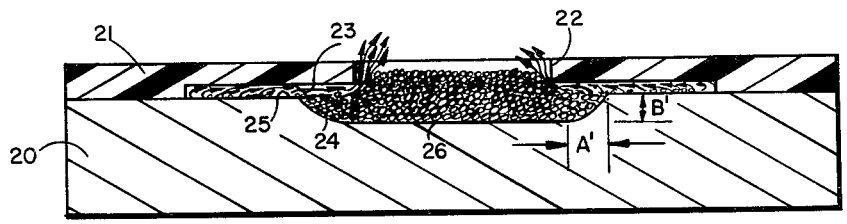
FIG. 7
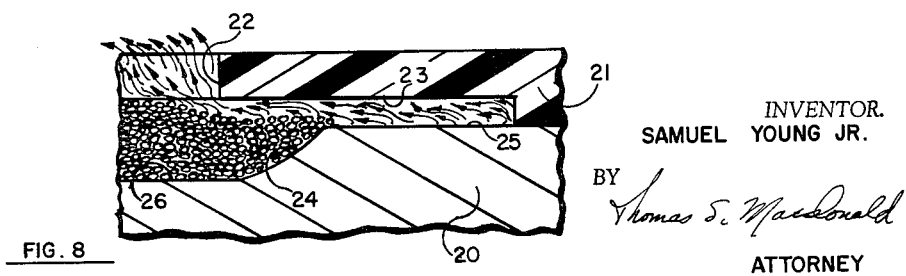
FIG. 8
INVENTOR.
SAMUEL YOUNG JR.
BY Thomas S. Macdonald
ATTORNEY

United States Patent Office 3,210,226
Patented Oct. 5, 1965

3,210,226
METHOD AND MEANS FOR CONTROLLING
TAPERS IN ETCHING PROCESSES
Samuel Young, Jr., La Mirada, Calif., assignor to
North American Aviation, Inc.
Filed Sept. 28, 1961, Ser. No. 141,353
9 Claims. (Cl. 156—8)

This invention relates to a method for controlling tapers of an etched workpiece and more particularly relates to a method for effecting a controlled taper at selected portions which are formed in an etched pocket of a workpiece.

Pocket portions produced by etching techniques such as the etching process described in U.S. Patent No. 2,739,047, generally comprise semicircular cutout portions between the land and bottom-most portions of the formed pocket. Such a semicircular cutout portion generally comprises a radius which is approximately equal to the depth of the etched cut. The relatively pronounced type radii thus formed function to cause undesirable stress concentrations thereat which oft-times result in reduced fatigue properties. Such a conventionally etched structure will be hereinafter more particularly noted in connection with FIG. 1. Heretofore, attempts have been made to either design the workpiece so as to avoid such stress concentration problems or to subsequently remedy the problem by means of mechanical milling operations or the like. The present-day requirements for intricately designed missile components and the like, which are desirably fabricated from extremely high strength metals such as Rene 41, for example, has further increased the above stated problems. It becomes particularly apparent that the utilization of mechanical techniques for the fabrication of such parts becomes difficult if not impossible.

The present invention has overcome many of the inadequacies afforded by present-day fabrication techniques. This invention provides a method for simultaneously effecting and controlling taper portions adjacent to land portions of an etched workpiece to thereby improve the fatigue and stress characteristics thereof. A conventional maskant material having the desired etch patterns scribed thereon is formed onto the workpiece. A means is constructed and arranged between the workpiece and maskant material to permit a controlled and relatively faster horizontal rate of etchant movement thereat, relative to the predetermined etch rate of the workpiece. The unit thus formed is then subjected to standard etching techniques in the conventional manner to thus effect the desired etch pattern on the workpiece. Simultaneously therewith and primarily for the fact that the horizontal etch rate at said means is relatively faster than the vertical etch rate of the workpiece material, stress reducing taper portions are automatically formed adjacent to the land portions of the etched workpiece.

It should be understood that the above mentioned standard etchant techniques may comprise a chemical etching bath or an electrolytic type etching means.

An object of this invention is to provide an etching method for selectively reducing stress concentration areas of a workpiece to thus enhance the fatigue properties thereof.

A further object of this invention is to provide an expeditious and efficient method for continuously controlling the fabrication of taper portions formed adjacent to land portions of an etched workpiece.

These and other objects of this invention will become apparent from the following description taken in connection with the accompanying drawings, in which:

FIG. 1 discloses a workpiece that has been etched in the conventional manner;

FIG. 2 discloses a workpiece that has been etched with the method comprising the novel concepts of this invention;

FIG. 3 discloses a workpiece as it would appear prior to the chemical etching thereof and prepared pursuant to a first method employing the novel concepts of this invention;

FIG. 5 is a partial cross-sectional view taken on lines 5—5 in FIG. 4;

FIG. 6 is a cross-sectional view disclosing an alternative method of preparing a workpiece;

FIG. 7 discloses the prepared workpiece of FIG. 6 as it would appear during the chemical etching thereof; and FIG. 8 discloses in greater detail a portion of the workpiece of FIG. 7.

Figure 1:
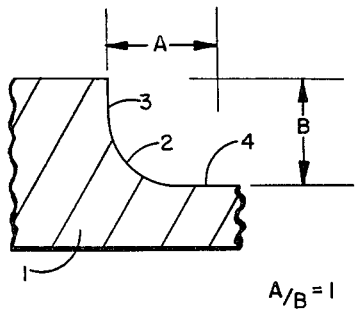

FIG. 1 discloses a typical workpiece as it would appear subsequent to the chemical etching thereof by means of conventional methods. As shown, during such a conventional chemical milling process a relatively small radius 2 is produced between the land (side wall) portion 3 and the bottom portion 4 of the etched pocket. The ratio of the horizontal etch rate in the A direction to the vertical etch rate in the B direction generally comprises unity (1 to 1), thus, undesirably providing for such relatively sharp radii. As hereinbefore stated, such radii function to cause a stress concentration thereat which oft-times results in a marked decrease in the fatigue properties of the workpiece 1.

Figure 2:
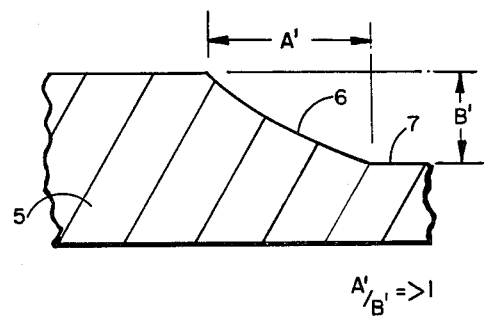

FIG. 2 discloses a typical workpiece 5 fabricated by utilizing the novel concepts of this invention. As shown, the finished workpiece provides a graduated substantially flat tapered portion 6 connecting the bottom portion 7 of the etched pocket and the top surface of the workpiece 5. Such a tapered portion 6 is primarily effected due to the fact that the horizontal etch rate A' is selectively controlled to preferably be slightly greater than the vertical etch rate B'. Although as will be hereinafter more fully explained, the novel concepts of this invention may be utilized to permit a greater rate of etchant movement in the B' direction relative to the horizontal etch rate in the A' direction, i.e., the A'/B' ratio may be less than unity, it is desirable in most applications to provide a relatively faster horizontal etch rate. As will also be hereinafter more fully explained, the etch rate ratio may be selectively controlled to comprise any desired ratio. For example, the A'/B' ratio may preferably comprise ratios selected from the range of 2 to 1 to 10 to 1, depending on the particular work application.

FIG. 3 discloses a prepared workpiece 10 as it would appear prior to the chemical etching thereof. As will be hereinafter more fully explained, the workpiece 10 may comprise any desired metal constituent. It should be noted in this regard that the novel concepts of this invention are particularly adapted for the fabrication of extremely hard metallic workpieces such as Inconel 718, Rene 41, Vasco-Jet 1000, 15–7 Mo Steel, titanium, and the like. The chemical composition and some of the mechanical and physical properties of these materials and others to which the principles of this invention are applicable are described in Air Weapons Materials Application Handbook, Metals and Alloys, ARDC TC 59–66, Air Research and Development Command, United States Air Force (1959). Further reference is made for properties of these materials to the Metals Handbook, volume I, Properties and Selection of Metals, 8th edition, American Society for Metals, Metals Park, Ohio (1961) and Inconel "718" Age-Hardenable Nickel-Chromium Alloy, International Nickel Company (1960).

A layer 12, comprising the sizing constituent, is selectively coated or sprayed onto the top surface of the workpiece 10 by conventional methods. The sizing constituent comprises one which has a relatively faster etch rate than that of the workpiece 10. Typical examples thereof comprise cadmium, copper, aluminum, zinc, nickel, etc. The thickness of the sizing constituent depends on the particular work application. For example, in many structural air frame applications it has been found advantageous to employ a thickness selected from a range of 3 to 100 mils. A conventional maskant 13 is selectively formed on the sizing 12 by brushing, dipping or other standard adhering type techniques and has the desired etch pattern 14 inscribed therein. The maskant 13 may comprise any standard material such as a Boray Steel maskant (basically butyl rubber) which is manufactured by the Boray Mfg. Co. or one of the maskants set forth in Patent No. 2,885,273, for example. The primary function of the selected maskant is that it be virtually chemically inactive with respect to the chemical etching bath which is used therewith. Thus, removal of a cutout portion 15 of the maskant 13, which is enclosed by the scribed pattern 14, exposes the sizing layer 12 and workpiece 10 to the subsequently applied etching constituent. In most applications it is also desirable to remove that portion (not shown) of the sizing 12 which is juxtaposed to the stripped off portion 15 of the maskant. However, the desired results may be also readily obtained in most applications even though such a portion is not removed prior to the etching step.

Figure 4:
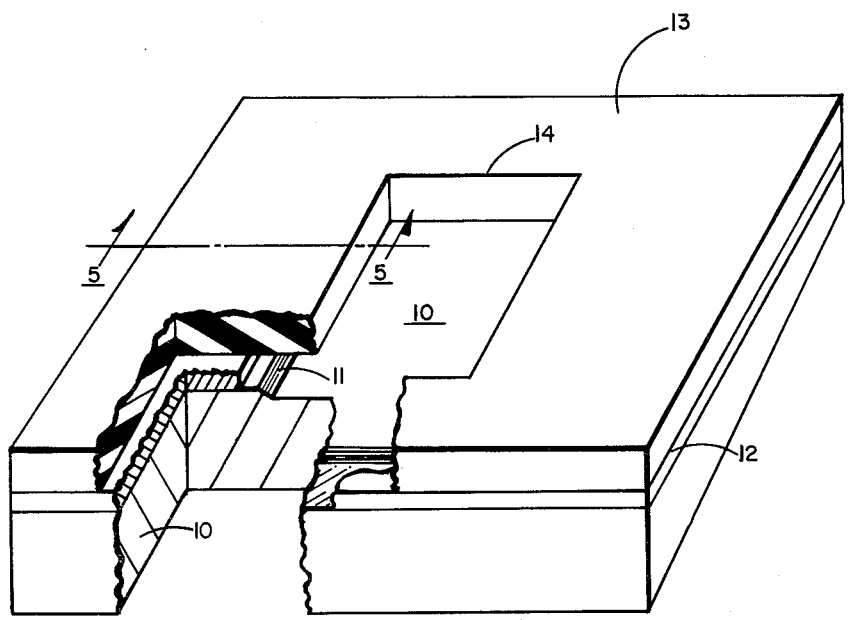
FIG. 4 is a partially broken away cross-sectional view of the workpiece of FIG. 3 as it would appear during the chemical etching thereof.

As more clearly shown in FIGS. 4 and 5, with the portion 15 of the maskant removed the etchant is free to etch the exposed portions of the workpiece 10 and the sizing 12. The entire unit thus formed may be immersed in a standard etchant bath. However, in the alternative, an etchant constituent may be selectively applied by standard sponging, splashing or brushing techniques at the portion of the workpiece 10 which is exposed due to the removal of the maskant portion 15.

As more clearly shown in FIG. 5, the sizing 12 is adapted to etch relatively faster than the workpiece 10 thus, providing a narrow space 16 between the maskant material 12 and the workpiece 10. Such a relatively narrow space 16 assures that there is a sufficient etchant flow 17 therein to assure continuous etching of the layer 12 in the horizontal or A' direction. The etchant is free to effect the desired taper 11 by permitting a controlled and faster etch rate in the A' direction relative to the vertical etch rate which is effected in the B' direction. Such a desired function occurs due to the progressive and relatively greater surface exposure of the workpiece portions which are in juxtaposed relationship with respect to the sizing 12.

It has been found that when the novel concepts of this invention, as hereinbefore described, were applied to a Rene 41 alloy that when the sizing constituent 12 comprised substantially pure cadmium or nickel, that the controlled etch rate ratio (A'/B') approximated 2:1. The etching bath used therefor essentially comprised hydrochloric acid, nitric acid and ferric chloride. Combinations of a PH15–7 Mo (annealed) alloy with zinc and aluminum sizing constituents 12 afforded respective etch rate ratios of 3:1 and 7:1. The etching bath used for these last mentioned combinations essentially comprised hydrochloric, nitric and phosphoric acids in desired proportions to effect the desired surface conditions and etch rate. Other acid etching baths suitable for the particular workpiece may be employed.

*Example I*

The following example should be particularly read in view of FIGS. 3–5 inclusive. A 2″ x 3″ PH15–7 Mo Steel paneled workpiece 10 was sized with an electroplated layer 12 of cadmium having a thickness of 8 mils. A standard butyl rubber maskant 13 having a thickness of 25 mils was selectively formed on the layer of cadmium. A cutout portion 15 having peripheral dimensions of 1″ x 1½″ as defined by the inscribed lines 14 was formed in the maskant and subsequently stripped off.

The workpiece was then immersed in an etchant bath having a composition comprising (by weight): 16% of 10 N. hydrochloric acid; 13% of 15 N. nitric acid; 33% of 45° Baumé ferric chloride solution; 7% of 40% basic chromic chloride; and 31% water. The bath temperature was maintained at approximately 120° F. The workpiece was subsequently etched to a depth of approximately 100 mils. The workpiece was then taken out of the etchant bath and the maskant material was removed. The workpiece was then washed in a 6 N. hydrochloric acid bath so as to entirely remove the cadmium layer.

The etched surface portions of the workpiece were found to be substantially smooth and regular and the ratio of the horizontal etch rate in the A' direction to the vertical etch rate in the B' direction was measured and noted as closely approximating 4 to 1.

FIGS. 6–8 disclose an alternative method of preparing and chemically etching a workpiece 20. This method is particularly adapted for the forming of relatively small workpieces. The workpiece 20 is selectively masked with a maskant 21 which preferably comprises a constituent which is not chemically affected during the fabrication of the workpiece. For example, when the workpiece 20 comprises a PH15–7 Mo Steel panel, the maskant material may conveniently comprise titanium. Also, these concepts herein disclosed are particularly adapted for the fabrication of a titanium panel wherein an aluminum maskant, for example, can be conveniently employed. The etchant bath which is selected to chemically etch the steel workpiece should preferably comprise one which has little, if any, chemical etching effect on the particular maskant.

The maskant is prefabricated to comprise a cutout portion 22 having a predetermined configuration and an undercut portion 23 which functions to separate the workpiece 20 and maskant 21 by an illustrated distance C. As shown, a gas pocket is thus formed wherein the trapped gas functions to provide a means for selectively permitting a controlled relatively faster rate of movement of the etchant in a horizontal direction relative to the predetermined etch rate of the workpiece 20. Such a function is substantially identical with that which was hereinbefore described in connection with the layer of sizing constituent 12 of FIGS. 3–5. It is believed that the gas mass continued in the pocket formed by the undercut portion 23 functions to selectively control the horizontal progress of the etchant, i.e., the etchant functions to cause a displacement thereof at a predetermined linear rate.

FIG. 7 discloses the preformed unit of FIG. 6 as it would appear subjected to a conventional chemical etching bath. As hereinbefore stated, the gas which is trapped in the relatively narrow undercut portion 23 functions to permit a controlled faster rate of etchant movement in the horizontal A' direction relative to the vertical etch rate of the workpiece in the B' direction. Such a controlled movement of the etchant functions to selectively cover a progressively enlarged area of the upwardly facing land portions 25. Thus, substantially flat stress reducing tapered portions 24 are selectively formed to connect the land portions 25 and bottom-most portions 26 of the etched pocket in much the same manner as hereinbefore described in connection with FIGS. 4 and 5.

As more clearly shown in FIG. 8, it should be noted that primarily due to the relatively dense and viscous nature of the liquid type etchant constituent relative to the formed gases that such constituent functions to spread along the bottom-most portion 26 of the workpiece and rightwardly into the pocket formed by the undercut portion 23. Simultaneously therewith, the pocket of trapped gas functions to impede the constituent flow and also begins to flow thereover, as shown. The rate of gas flow and thus the movement of the etchant constituent in the A' direction is primarily dependent on the particular workpiece material selected, the distance C, the type of constituent utilized and the working parameters of the constituent. The above stated functions are continuous since constant reaction of the etchant constituent with the bottom-most portion 26 of the workpiece assures a sufficient and predetermined rate of gas evolvment.

It should be again noted that the selectively controlled A'/B' etch ratio is primarily dependent on the particular workpiece material selected, the undercut distance C (FIG. 6), the particular etchant bath utilized and the working parameters of said bath. It is preferable in most work applications to employ a distance C which is selected from a range of 3 mils to 100 mils. When this particular method is used it is generally desirable to avoid any appreciable amount of etchant bath agitation and to further prevent a tilting of the workpiece during the immersing thereof into said bath. Such is generally desirable so as to assure that the etchant impeding mass of gas which is trapped in the pocket portions formed by the undercut portion 23 is maintained substantially uniform in said pocket portions during the etching process. Thus, the formed tapered portions 24 will provide a substantially flat and uniform surface.

The above descriptions are by way of illustration only and should not be construed to limit the scope of this invention. For example, the layer of sizing constituent 12, as shown in FIGS. 3–5 and the distance C shown in FIGS. 6–8, can both be constructed and arranged to comprise a tapered cross-section. This refinement would function to either linearly increase or decrease the A'/B' ratio, primarily depending on the degree of taper and the relative orientation thereof. Also, the particular materials comprising the sizing constituents, workpiece materials, etc. are by way of illustration only and other standard materials may be substituted therefor by one skilled in the art. It should be further understood that the etched workpiece surfaces which have been hereinbefore described as flat, for illustration purposes, can taken the form of other shapes such as cylindrical, elliptical, etc.

*Example II*

The following examples should be read in view of FIGS. 6–8. A 2" x 3" PH15–7 Mo Steel paneled workpiece 20 was selectively covered with a titanium maskant 21 having an approximate thickness of 50 mils. Although the maskant generally comprises a non-metallic constituent as illustrated, it is sometimes preferable to employ a metallic maskant such as titanium. However, as above stated, such a chosen maskant should be virtually non-chemically active with respect to the chemical etching bath employed therewith. The cutout portion 22 and undercut portion were constructed and arranged in the maskant 21 to form a 2¾" x 1½" and 3¼" x 2" rectangular openings, respectively. The distance C was constructed and arranged to approximate 6 mils.

The formed unit was then slowly lowered into an etchant bath taking care that a tilting thereof did not occur, i.e., the bottom surface of the workpiece was maintained substantially parallel to the horizontally constructed and arranged bottom of the etchant container. The etchant bath which does not attack titanium comprised (by weight): 16% of 10 N. hydrochloric acid; 13% of 15 N. nitric acid; 33% of 45° Baumé ferric chloride solution; 7% of 40% basic chromic chloride; and 31% water. The bath temperature was maintained at approximately 120° F. and care was taken not to cause an undue agitation of the etchant bath.

The exposed workpiece surface was then etched to a depth of approximately 100 mils. The etched workpiece was then removed from the etchant bath and the titanium maskant 21 was then stripped off the workpiece by standard mechanical means. The workpiece was then washed in a water bath. The etched surface portions of the workpiece were found to be substantially smooth and regular and the ratio of the horizontal etch rate in the A' direction to the vertical etch rate in the B' direction was found to closely approximate 5 to 1.

Although this invention has been described and illustrated in detail, it is to be understood that the same is by way of illustration and example only and is not to be taken by way of limitation, the spirit and scope of this invention being limited only by the terms of the appended claims.

I claim:
1. A method of chemical milling comprising:
    masking a portion of the surface of a metal workpiece with an etch resistant mask having edges for exposing a portion of said workpiece;
    subjecting the exposed portion of said workpiece to liquid etching medium for etching the exposed portion to form a depression having edge fillets;
    controlling the advancement of the liquid etching medium under the edges of said mask, between said mask and the unetched workpiece surface at a rate relatively faster than the rate of advancement of etching medium normal to the surface of said workpiece for forming the edge fillets as tapered portions between the depression and the surface of said workpiece.
2. The method of claim 1 wherein the ratio of the rate of etching medium advancement under the edges of said mask to the rate of advancement of etching medium normal to the surface of said workpiece is selected from a range of 2 to 1 to 10 to 1.
3. The method of claim 1 wherein the control of advancement of liquid etching medium includes the step of coating masked portions of the workpiece, between the mask and the workpiece, with a second metal having an etch rate in said liquid etching medium greater than the etch rate of the workpiece in said liquid etching medium.
4. The method of claim 1 wherein the control of advancement of liquid etching medium includes the step of forming an undercut portion on said mask to provide air entrapping pockets between the mask and workpiece at the mask edges.
5. A method for forming taper portions adjacent a recess on an etched structural workpiece comprising:
    coating selected surface portions of a metal workpiece with a material having a known etch rate that is faster than the etch rate of said workpiece when said material and said workpiece are subjected to a particular etching solution;
    covering said coating material with an etchant resistant mask material leaving selected surface portions of the coated workpiece exposed;
    etching through said exposed coating material to expose a portion of said workpiece;
    etching a recess into said workpiece conforming to the exposed portion thereof; and simultaneously,
    etching said coating material between said maskant material and said workpiece to expose increasing areas of said workpiece to the etching solution whereby said coating material is laterally etched at a faster rate than the workpiece.
6. The method of claim 5 wherein said material having a faster etch rate is built up to a thickness selected from the range of 3 to 100 mils in said coating step.
7. The method of claim 5 wherein the workpiece is a stainless steel and the coating is a layer of cadmium having a thickness of about 8 mils., said etching medium comprising hydrochloric acid, nitric acid, ferric chloride, chromic chloride and water.
8. A method of chemical milling a metal workpiece comprising:
    forming a mask of etchant resistant material conforming to the surface of said workpiece, said mask hav- ing edge portions and undercut portions adjacent said edge portions, said undercut portions being adapted to be spaced apart from the workpiece surface when the mask is applied to said workpiece;

assembling the mask to the workpiece surface so that a portion of said workpiece is exposed and said undercut portions form a pocket between the mask and the workpiece surface;

subjecting the assembly to the action of an etchant so that the exposed portion of said workpiece is etched and a bubble of air is trapped in the pocket; and slowly displacing the air from the pocket with the etchant to control the rate of lateral advancement of the etchant into the pocket at a rate faster than rate of advancement of the etchant normal to the surface of the workpiece.

9. The method of claim 8 further comprising the step of arranging said undercut portion to separate said workpiece from said mask at a distance selected from the range of 3 to 100 mils.

References Cited by the Examiner

UNITED STATES PATENTS

| | | | |
|---|---|---|---|
| 1,260,395 | 3/18 | Keller | 156—7 |
| 2,421,607 | 6/47 | Fowler | 156—13 |
| 2,584,317 | 2/52 | Aller | 156—18 |
| 2,731,333 | 1/56 | Ko et al. | 156—3 |
| 2,739,047 | 3/56 | Sanz | 161—122 X |
| 3,031,276 | 4/62 | Duvall | 156—18 |
| 3,035,990 | 5/62 | Davis et al. | 156—11 XR |
| 3,053,719 | 9/62 | Jones et al. | 156—18 |

FOREIGN PATENTS 11,192  6/94  Great Britain.

EARL M. BERGERT, *Primary Examiner.*

JACOB STEINBERG, *Examiner.*